US006148723A

United States Patent [19]

Pemberton et al.

[11] Patent Number: 6,148,723

[45] Date of Patent: Nov. 21, 2000

[54] WEATHER RESISTANT SIGNAGE AND A PROCESS FOR FABRICATION THEREOF

[76] Inventors: Roland E. Pemberton; Kirk Pemberton, both of 18424 S. Dalton Ave., Gardena, Calif. 90248

[21] Appl. No.: 09/157,781

[22] Filed: Sep. 21, 1998

[51] Int. Cl.$^{7}$ .............................. B41M 1/12; C09F 7/00

[52] U.S. Cl. .............................................. 101/129; 40/584

[58] Field of Search ................................ 101/129, 128.4, 101/491; 40/584, 594, 624

[56] References Cited

U.S. PATENT DOCUMENTS

| | | | |
|---|---|---|---|
| 2,779,269 | 1/1957 | Hill | 101/129 |
| 3,943,105 | 3/1976 | Hermes | 260/47 C |
| 4,415,607 | 11/1983 | Denes et al. | 427/96 |
| 4,848,348 | 7/1989 | Graighead | 128/639 |
| 5,215,826 | 6/1993 | Shimanski et al. | 428/483 |
| 5,270,507 | 12/1993 | Nakamura et al. | 200/511 |
| 5,854,306 | 12/1998 | Mattesky et al. | 101/491 |

*Primary Examiner*—John S. Hilten
*Assistant Examiner*—Leslie J. Grohusky, Jr.
*Attorney, Agent, or Firm*—Leonard Tachner

[57] ABSTRACT

A process of fabricating weather resistant signage by screen printing indicia on a UV-treated impregnated polyester protective film using a Cellosolve acetate-based ink. The resulting sign is extremely resistant to solar UV, thus preserving the indicia brightness and clarity for a very long period of time even under the most extreme conditions. The screen printing process of the preferred embodiment comprises the steps of first preparing a film image, then preparing a fabric mesh ranging from 125 to 230 mesh for black and white images and ranging from 355 to 425 mesh for halftone color images. The fabric mesh is attached to a stencil and the film image is attached to the stencil. The combination is placed into a vacuum frame for exposure to high intensity light, after which the stencil is washed with pressurized water, dried by fan, taped and touched up for pinholes or other blemishes. The ink used in the preferred embodiment comprises a clear base having Cellosolve acetate, SC-150 aromatic solvent, VITEL PE-200, VITEL PE-222 and VITEL PE-307 solvent-based coating resins, as well as thinner and resin and other ingredients. The preferred embodiment of the invention uses a unique substrate for the sign material. Generally, the substrate comprises a UV treated, impregnated polyester protective film.

6 Claims, 1 Drawing Sheet

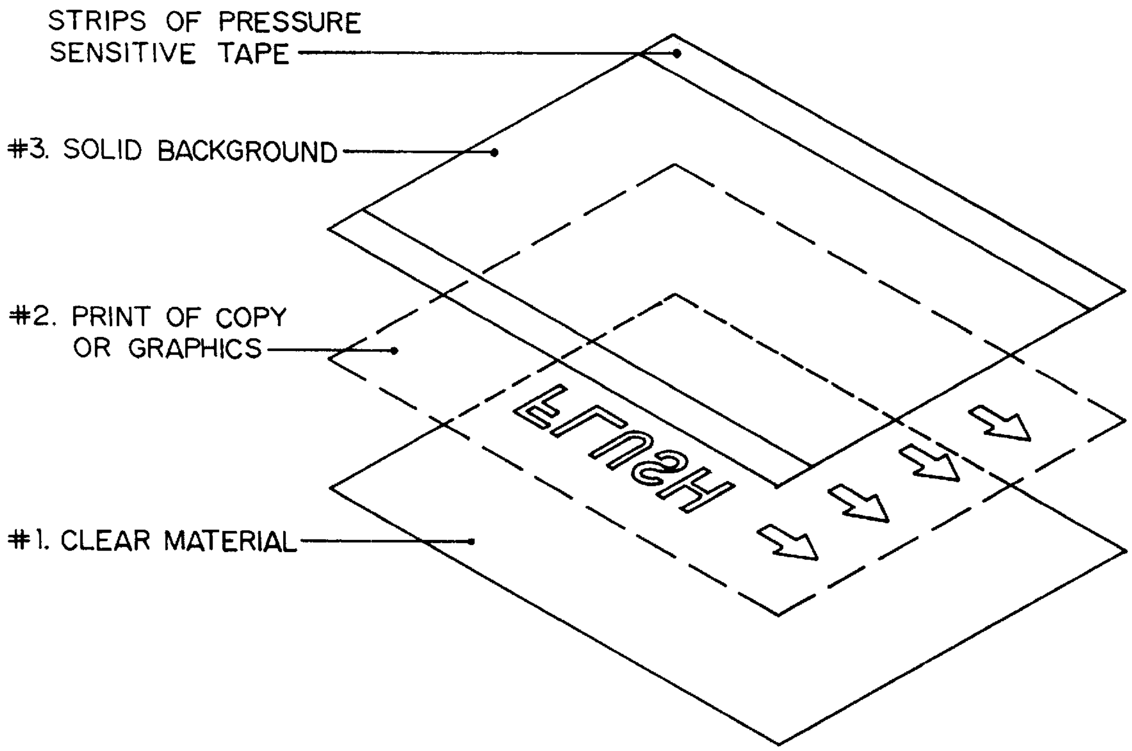
STRIPS OF PRESSURE SENSITIVE TAPE
#3. SOLID BACKGROUND
#2. PRINT OF COPY OR GRAPHICS
#1. CLEAR MATERIAL

WEATHER RESISTANT SIGNAGE AND A PROCESS FOR FABRICATION THEREOF

BACKGROUND OF THE INVENTION

1. Field of the Invention

The present invention relates generally to the field of signs bearing indicia such as advertising signs, and more particularly to signs especially adapted to resist the effects of weather including solar ultraviolet radiation and the like.

2. Prior Art

Conventional outdoor advertising signs have a relatively short life span. A typical dye impregnated lithograph sign, when subjected to sunlight virtually on a daily basis, begins to fade and deteriorate in a matter of months. A typical screen printed sign, having conventional pigmentation in the form of tints and tones, on a standard substrate, has a maximum life span of a few years. Signs which last only months or even a few years, are inadequate in many applications. For example, signs on outdoor vending machines, billboards, retail stores and the like, would be inordinately expensive to replace even every few years. Either because of their prolific numbers (i.e., vending machines) or their large size, frequent sign replacement can be very costly.

Accordingly, their is an ongoing need for an improved sign, having a substrate material and an ink, which can remain relatively unaffected by sunlight and other weather phenomenon even for a decade or more.

SUMMARY OF THE INVENTION

The present invention comprises a process of fabricating weather resistant signage by screen printing indicia on a UV-treated impregnated polyester protective film using a Cellosolve acetate-based ink. The resulting sign is extremely resistant to solar UV, thus preserving the indicia brightness and clarity for a very long period of time even under the most extreme conditions. The process of the present invention thus results in a sign which is superior to prior art signs, particularly when exposed to sunlight and other weather-induced effects over a period of at least 10 to 20 years.

The screen printing process of the preferred embodiment comprises the steps of first preparing a film image, then preparing a fabric mesh ranging from 125 to 230 mesh for black and white images and ranging from 355 to 425 mesh for color images. The fabric mesh is attached to a stencil and the film image is attached to the stencil. The combination is placed into a vacuum frame for exposure to high intensity light, after which the stencil is washed with pressurized water, dried by fan, taped and touched up for pinholes or other blemishes. The ink used in the preferred embodiment comprises a clear base having Cellosolve acetate, SC-1 50 aromatic solvent, VITEL PE-200, VITEL PE-222 and VITEL PE-307 solvent based coating resins, as well as thinner and resin and other ingredients to be detailed hereinafter. Pigment is added to the clear base as desired to achieve color density and printability.

The preferred embodiment of the invention uses a unique substrate for the sign material. Generally, the substrate comprises a UV treated, impregnated polyester protective film in gauge 48 to 500, such as "COURTGUARD" film sold by Courtaulds Performance Films of Martinsville, Va.

After the screen printing process is completed, either by hand or by semi-automatic press, the inked substrate is dried at about 180 degrees Fahrenheit and at about 15 feet/minute feed rate through a standard conventional gas or electrical dryer with heat chamber and forced air. The inventive method is then completed with cutting and finishing as required for a particular application. The resulting sign has an expected outdoor life of 15 to 20 years without color fade and with no perceptible material deterioration.

OBJECTS OF THE INVENTION

It is therefore a principal object of the present invention to provide a process for fabricating superior weather resistant signs such as for outdoor advertising and the like.

It is another object of the present invention to provide a novel combination of ink, substrate and printing method to improve the lifespan of signage exposed to UV radiation such as sunlight.

It is still another object of the invention to provide a novel process of screen printing onto a polyester protective film substrate to fabricate advertising signs which have substantially longer life than prior art advertising signs.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawing in which:

FIG. 1 is a representation of the steps of the method of the invention for forming a longlife sign that can be exposed to sunlight.

DETAILED DESCRIPTION OF A PREFERRED EMBODIMENT

The preferred embodiment of the present invention comprises the process of screen printing weather resistant signs. The novelty of the process resides primarily in the combination of substrate and the ink used to fabricate the signs. The ink is formed from a clear base which, in the preferred embodiment, has the ingredients listed in Table I herein.

TABLE I

INK CLEAR BASE

| WT/GAL | VOLUME | MATERIAL | WEIGHT |
|---|---|---|---|
| 8.11 | 3.58 | CELLOSOLVE ACETATE | 29.00 |
| 7.46 | 1.92 | SC-150 AROMATIC SOLVENT | 14.35 |
| 8.57 | 0.56 | METHYL PYRROLIDONE | 4.78 |
| 10.52 | 0.24 | BENZOFLEX S-404 | 2.55 |
| 10.42 | 0.73 | VITEL PE-200 | 7.65 |
| 10.08 | 1.01 | VITEL PE-307 | 10.21 |
| 10.41 | 0.49 | VITEL PE-222 | 5.12 |
| 7.94 | 0.22 | TW1810 THINNER | 1.73 |
| 8.70 | 0.30 | CK-2400, PHENOLIC RESIN | 2.59 |
| 7.94 | 1.21 | TW1810 THINNER | 9.61 |
| 10.83 | 0.59 | VYES VINYL RESIN | 6.41 |
| 6.84 | 0.01 | BYK 052 | 0.10 |
| 18.18 | 0.23 | SILCRON G-600 | 4.10 |
| 8.43 | 0.19 | SILWET L-77 | 1.60 |
| 11.00 | 0.02 | MEGAFAC F-177 | 0.20 |

The principal ingredients of the clear base, based upon volume, are Cellosolve acetate, SC-15-aromatic solvent, VITEL PE-200, PE-222 and PE-307 solvent based coating resins, methyl pyrrolidone, TW 1810 thinner and Vyes vinyl resin. The substrate is a polyester film having the chemical name "polyethylene terephthalate". The material is impregnated with ethylene glycol and transmits less than 2% of incident ultraviolet light at a wavelength of 358 nm. The substrate thickness depends upon the desired usage but generally speaking the thicker the substrate the more durable the sign exposed to direct sunlight. Commercially available thicknesses range from 48 gauge to 500 gauge.

The steps of the present process, using the aforementioned ink and substrate, comprise the following:

Step (1) Production art: Black-and-white rendering camera ready. Tracings can be cut by hand on Rubylith or computer-controlled plotter.

Step (2) Photographic copy of art: Using a process camera, computer or scanner line film is used to produce a negative or positive image on film. After film is processed and dried, touch-up pinholes and prepare for making a film positive or negative via a contact printer to produce a film negative or positive. Touch film up to correct blemishes. This film is to be used for making a screen for printing.

Step (3) Select fabric mesh: Ranging from 125 mesh to 330 mesh, a proper mesh and a proper stencil should be used. Direct or indirect stencil, depends on subject to be printed. Subject can be face up or face down.

Step (4) Making a screen for print: A film positive or negative is taped to the stencil. The screen with stencil attached to fabric is placed into a vacuum frame ready for exposure by high-intensive light source. After exposure, stencil is washed out by water under pressure. Screen is dried by fan, taped and touched up for pinholes or other blemishes.

Step (5) Printing: Screen printing by hand or semi-automatic press. Type of press is dictated by quantities and sheet size to accommodate design size.

Step (6) Drying: Feed the printed substrate through a standard conventional gas or electrical dryer with heat chamber and forced air at about 180 degrees Fahrenheit at a rate of about 15 feet/minute.

Step (7) Cutting: Various sheet by Rosenthal sheeter, power shear, die cutting or by hand.

Step (8) Bindery or finishing: Inspection, adhesive application, typical hand lamination, power laminator or screen-printed adhesive. If size of finished design is finished in roll form, an adhesive coater can be used.

Use of a described ink (with the addition of a selected pigment) on the disclosed substrate in the aforementioned screen printing process, results in a sign which can withstand direct sunlight with little or no apparent deterioration for 10 to 20 years.

Having thus described a preferred embodiment of the invention, it being understood that the scope of protection hereof is not limited to the disclosed embodiment but only by the appended claims, what is claimed is:

1. A method of fabricating a durable sign resistant to degradation from outdoor environmental exposure comprising the steps of:

(a) establishing a substrate including an ethylene glycol impregnated polyethylene terephthalate base material;

(b) establishing an ink including a predetermined quantity of a Cellosolve acetate component;

(c) establishing a film image;

(d) forming a screen containing said film image in accordance with a mesh parameter within an approximating range of 125 to 425;

(e) printing upon said substrate by applying said ink to at least a portion of said substrate through said screen for establishing thereon visual indicia corresponding to said film image; and, (f) drying said ink applied to said base material;

whereby said durable sign is adapted to maintain said visual indicia without substantial fade and without substantial material deterioration over an extended period of substantially undisturbed outdoor use greater than 10 years.

2. The method as recited in claim 1 wherein said screen of step (d) is fabric-mesh-formed.

3. The method as recited in claim 1 further comprising the steps of cutting said printed substrate, and applying an adhesive material thereto.

4. The method as recited in claim 1 wherein step (c) includes establishing said ink to further include predetermined quantities of aromatic solvent, thinner, resin, and pigment components.

5. A durable sign resistant to degradation from outdoor environmental exposure comprising:

(a) a substrate including an ethylene glycol impregnated polyethylene terephthalate base material; and, (b) visual indicia formed on said substrate by an ink containing a predetermined quantity of a Cellosolve acetate component, said ink being applied by a screen printing process to a selective portion of said substrate in accordance with a mesh parameter within an approximating range of 125 to 425;

whereby said durable sign is adapted to maintain said visual indicia without substantial fade and without substantial material deterioration over an extended period of substantially undisturbed outdoor use greater than 10 years.

6. The durable sign as recited in claim 5 wherein said ink further includes predetermined quantities of aromatic solvent, thinner, resin, and pigment components.

* * * * *